(12) United States Patent
McHugh

(10) Patent No.: US 7,597,346 B2
(45) Date of Patent: Oct. 6, 2009

(54) MULTI-CHAMBER AIRBAG

(75) Inventor: Christopher McHugh, Lancs (GB)

(73) Assignee: Autoliv Development AB, Vargarda (SE)

( * ) Notice: Subject to any disclaimer, the term of this patent is extended or adjusted under 35 U.S.C. 154(b) by 247 days.

(21) Appl. No.: 11/591,756

(22) Filed: Nov. 2, 2006

(65) Prior Publication Data

US 2007/0096442 A1   May 3, 2007

(30) Foreign Application Priority Data

Nov. 3, 2005   (DE) .................. 10 2005 052 516

(51) Int. Cl.
 *B60R 21/16* (2006.01)
(52) U.S. Cl. .................. 280/729; 280/730.2; 280/743.1
(58) Field of Classification Search .............. 280/743.1, 280/730.2, 729
See application file for complete search history.

(56) References Cited

U.S. PATENT DOCUMENTS

| | | | | |
|---|---|---|---|---|
| 3,598,159 | A * | 8/1971 | MacIntyre | ............. 139/384 R |
| 5,021,283 | A * | 6/1991 | Takenaka et al. | ............ 428/116 |
| 2001/0042980 | A1* | 11/2001 | Sollars, Jr. | ............... 280/743.1 |

FOREIGN PATENT DOCUMENTS

GB   2 357 264   6/2001

\* cited by examiner

*Primary Examiner*—Ruth Ilan
(74) *Attorney, Agent, or Firm*—Brinks Hofer Gilson & Lione

(57) ABSTRACT

A multi-chamber airbag includes a first outer material layer, a second outer material layer, and at least one third material layer disposed between the first and second material layers. The three material layers are connected together along an edge section of the airbag. In a first partial section of the edge section only the first material layer is attached together with the third material layer and in a second partial section outboard of the first partial section only the second material layer is attached together with the third material layer. This increases the gas impermeability of the edge section.

4 Claims, 2 Drawing Sheets

MULTI-CHAMBER AIRBAG

CROSS REFERENCE TO RELATED APPLICATIONS

This application claims priority to German patent application number DE 102005052516.4, filed Nov. 3, 2005.

BACKGROUND OF THE INVENTION

1. Field of the Invention

The present invention relates to an airbag for use in a motor vehicle. More particularly, the invention relates to sealing a side curtain airbag having multiple chambers.

2. Description of Related Art

Multi-chamber airbags are known in the art and are often used as side curtain airbags. Outer layers of material (first and second material layers) form an outer shell of the airbag and at least a third layer of material is positioned between the first and second layers of material. In general, the third material layer is connected in several areas with the outer material layers, creating a multi-chamber structure. All three, or more, material layers are connected with each other at a circumferential edge.

However, side curtain airbags are required to maintain a high internal pressure created by a gas generator for a relatively long time, as long as several seconds, in order to offer sufficient protection over the entire duration of an accident, for example, when the vehicle rolls over or in a side impact. This requires a gas impermeable airbag.

The known multi-chamber airbags weave together the three or more layers of material in an edge section. All of the material layers run together along a closed line and are woven together with one another starting at the line. The material layers must be woven relatively loosely at the edge otherwise it would not be possible to weave together all three material layers into a single continuous edge. This arrangement allows an undesirable amount of gas to leak through the edge.

In view of the above, there exists a need for an improved side curtain airbag.

SUMMARY OF THE INVENTION

In satisfying the above need, as well as overcoming the enumerated drawbacks and other limitations of the related art, the present invention attaches together only two layers of material at each of at least two edge sections of a side curtain airbag. When the individual material layers are attached by weaving, this allows them to be more densely woven, resulting in improved gas impermeability. A further advantage is that the edge section of a multi-chamber airbag according to the present invention is more flexible than the edge section of the known multi-chamber airbag. The weaving together of the individual material layers can be continued in alternating multiple form, further increasing the gas impermeability of the edge.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
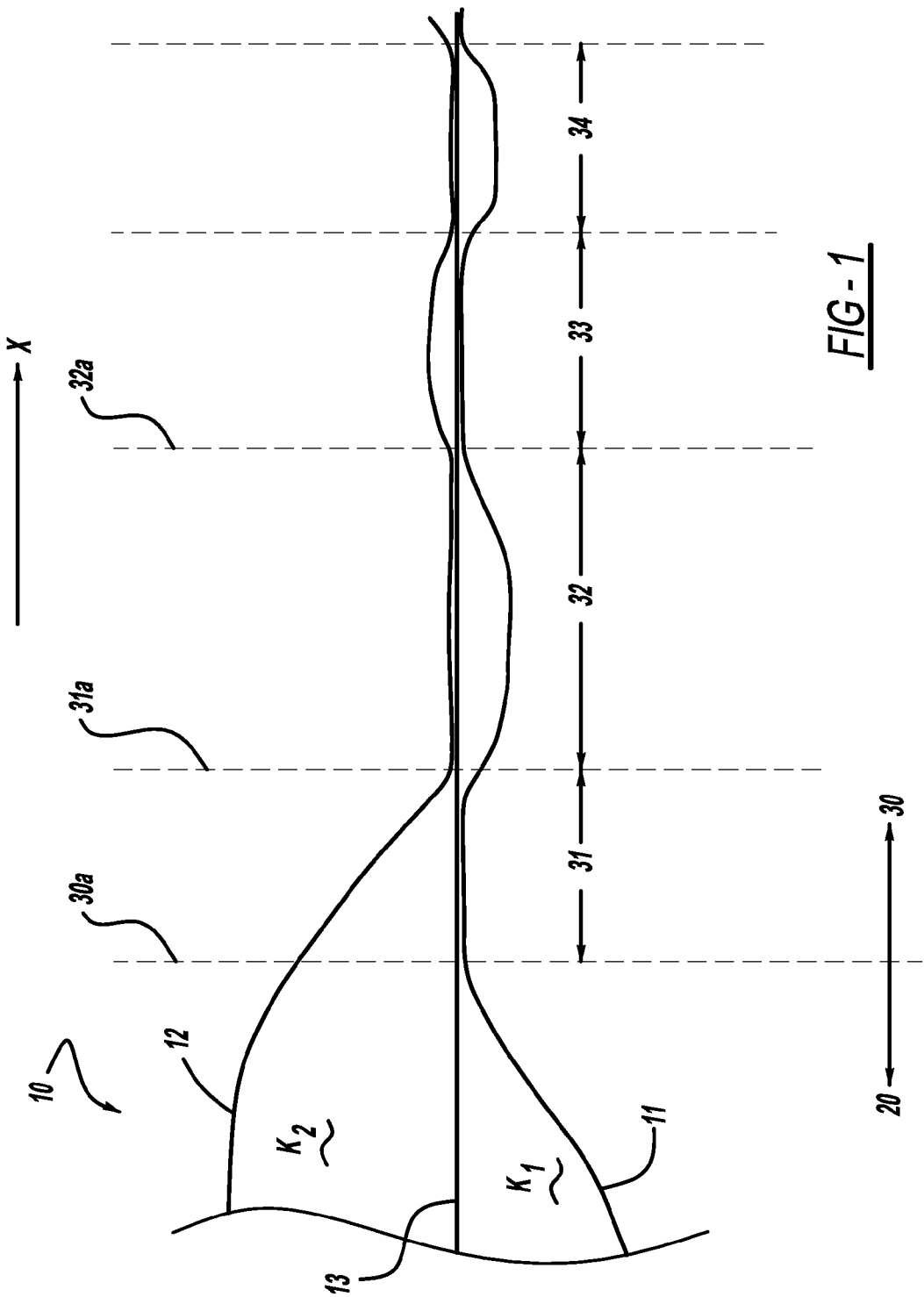
FIG. 1 is a cross-section through a multi-chamber airbag.

FIG. 1 shows a partial section through a multi-chamber airbag 10 according to the present invention including a transitional area between a chamber area 20 and an edge section 30.

In the chamber area 20, the multi-chamber airbag 10 includes two chambers K1 and K2. The multi-chamber airbag 10 is formed by a first material layer 11 and a second material layer 12. A third material layer 13 separates the two chambers K1 and K2 from one another.

In the edge section 30, all three material layers 11, 12 and 13 are attached together. In the present embodiment, the edge section 30 includes a first partial section 31, a second partial section 32 outboard of the first section 31, a third partial section 33 outboard of the second section 32, and a fourth partial section 34 outboard of the third section 33. In the first partial section 31, the first and third material layers 11 and 13 are attached together. In a transitional area 31a between the first partial section 31 and the second partial section 32, the first material layer 11 separates from the third material layer 13 and the second material layer 12 contacts the third material layer 13. The second material layer 12 is then attached to the third material layer 13 in the second partial section 32. In a transitional area 32a between the second partial section 32 and the third partial section 33, the second material layer 12 separates from the third material layer 13 and the first material layer 11 again contacts the third material layer 13. The first material layer 11 is again attached to the third material layer 13 in the third partial section 33. In the fourth partial section 34 the first and second material layers 11 and 12 alternate with the second material layer 12 again being attached to the third material layer 13 before an end of the edge section 30 is reached. The attached state of the two alternating material layers is shown in FIG. 1 by the parallel lines of the respective material layers 11, 12, and 13.

It can be seen that in each partial section 31, 32, 33, and 34, only two material layers are respectively attached with one another. This means that a correspondingly dense woven structure can be selected for the layers to achieve the desired gas impermeability. In this embodiment four partial sections are used and result in a high level of gas impermeability in an X direction. However, it should be understood that at least two partial sections may be used in other embodiments. Still other embodiments may use more than four partial sections. The various material layers may be attached together by any appropriate means including, but not limited to, glues, stitching, and weaving. In the embodiment of FIG. 1 the layers are woven together with a sufficiently dense pattern to ensure the desired level of gas impermeability.

Figure 2:
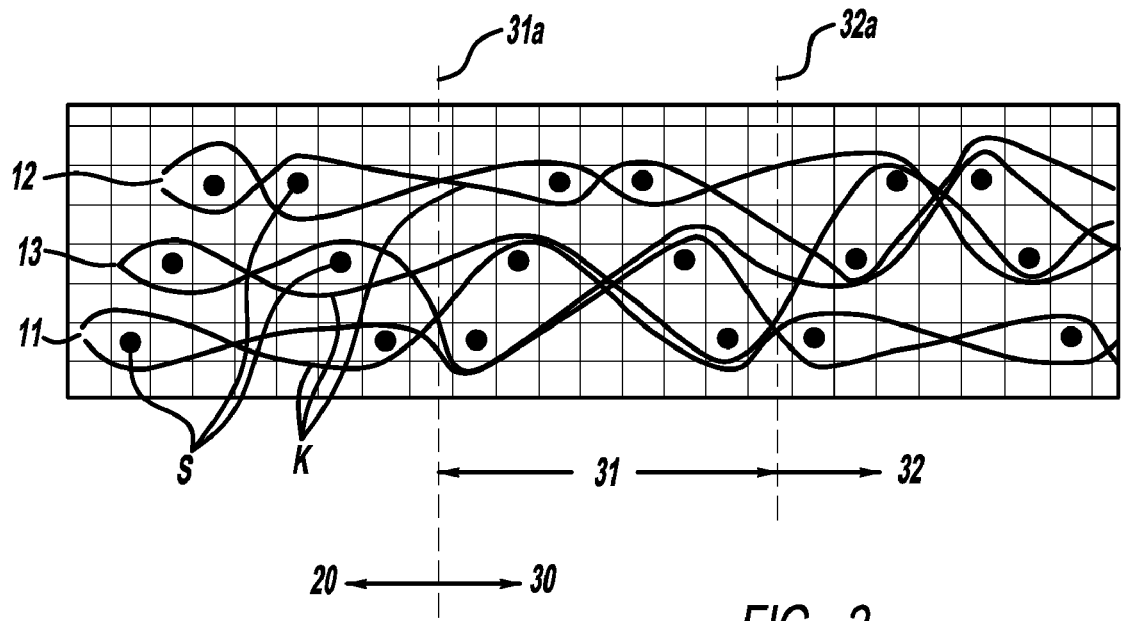
FIG. 2 is a schematic representation of several warp and weft threads at the transition from a chamber area of the multi-chamber airbag into an edge section of the multi-chamber airbag.

FIG. 2 shows a schematic representation of one example of how the three material layers 11, 12, 13 may be woven together. In this example, the transitional area 31a between the chamber area 20 and the edge section 30, along with only the first partial section 31 and the second partial section 32, are shown. Weft threads S are shown as dots to indicate that the threads run vertically out of the drawing plane. Warp threads K are shown as lines running along the drawing plane.

As can be seen in the chamber area 20, one level of warp threads (two of each are shown) respectively loop round a row of parallel weft threads S. In the first partial section 31, the warp threads K of the first material layer 11 and those of the third material layer 13 loop round the weft threads S of both material layers 11 and 13. In other words, in the first partial section 31 the first and third material layers are woven together into a first common weaving. At the transitional area 32a, the warp threads K of the first material layer 11 leave the first common weaving with layer 13 and are now only woven with the weft threads S of the first material layer 11. In the second partial section 32, the warp threads K of the second and third material layers 12 and 13 join and together loop round the weft threads S of both of the material layers 12 and 13 to form a second common weaving and so on.

Figure 3:
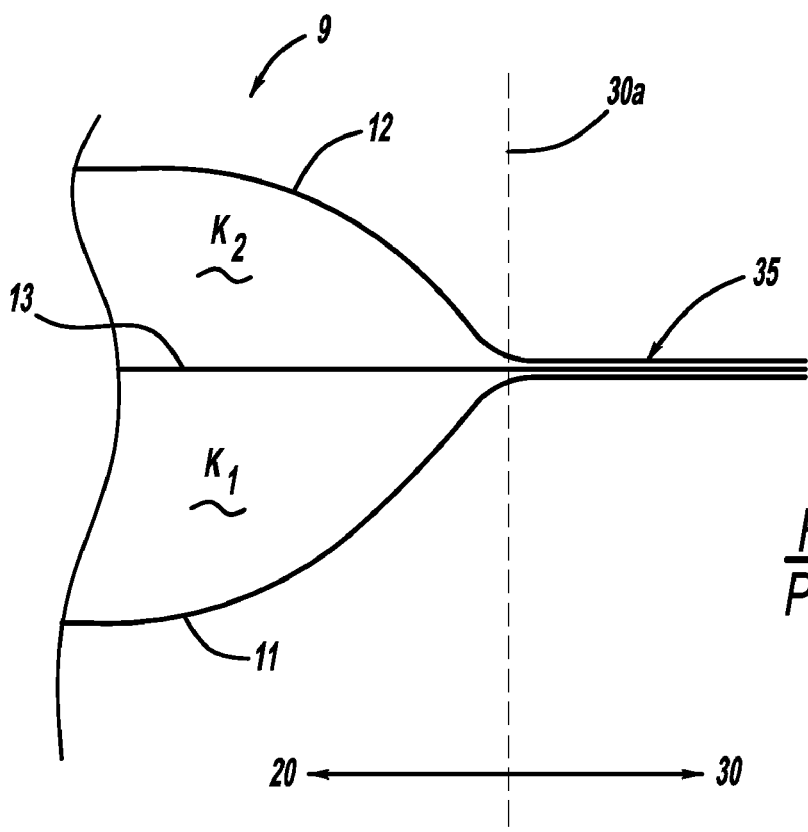
FIG. 3 is cross-section through a multi-chamber airbag according to the prior art.

FIG. 3 shows a section of a prior art multi-chamber airbag 9 in a transitional area 30a between the chamber area 20 and the edge section 30. Unlike the present invention, all three material layers 11, 12, and 13 run together at one point and are woven together in edge area 30 to form a single material layer 35. The single material layer 35 is more permeable to gas and less flexible than the present invention.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A multi-chamber airbag comprising a first outer material layer, a second outer material layer, and a third material layer disposed between the first and second material layers, the three material layers defining multiple chambers of the airbag and a peripheral edge section outboard of the multiple chambers, wherein the three material layers extend inward from an outermost end of the peripheral edge section toward the multiple chambers, the peripheral edge section including a first partial section extending inward from the outermost end of the peripheral edge section to a second partial section inboard of the first partial section and outboard of the multiple chambers, only the first and third material layers being woven together in the first partial section of the peripheral edge section wherein warp threads of the first and third material layers loop around weft threads of the first and third material layers, only the second and third material layers being woven together in the second partial section of the peripheral edge section wherein warp threads of the second and third material layers loop around weft threads of the second and third material layers.

2. The multi-chamber airbag according to claim 1, wherein the peripheral edge section further includes additional partial sections inboard of the second partial section of the peripheral edge section and outboard of the multiple chambers, the first and the third material layers and the second and the third material layers being alternately woven together in the additional partial sections of the peripheral edge section between the second partial section and the multiple chambers.

3. The multi-chamber airbag according to claim 1, wherein the multi-chambered airbag is a side curtain airbag.

4. The multi-chamber airbag according to claim 1, wherein the peripheral edge section limits the flow of an inflation gas from the chambers.

* * * * *